May 18, 1965

R. I. LYTLE ETAL 3,183,896

SEPARATING HEATER

Filed Jan. 15, 1964

INVENTORS
ROBERT I. LYTLE
GEORGE P. MORAN
WILLIAM D. STEVENS
BY
Richard H. Thomas
ATTORNEY May 18, 1965
R. I. LYTLE ETAL
3,183,896
SEPARATING HEATER
Filed Jan. 15, 1964
2 Sheets-Sheet 2
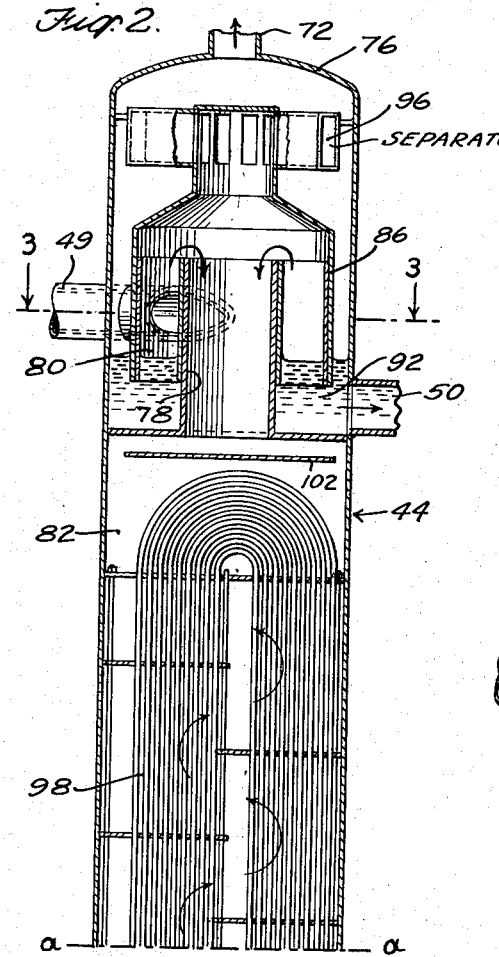
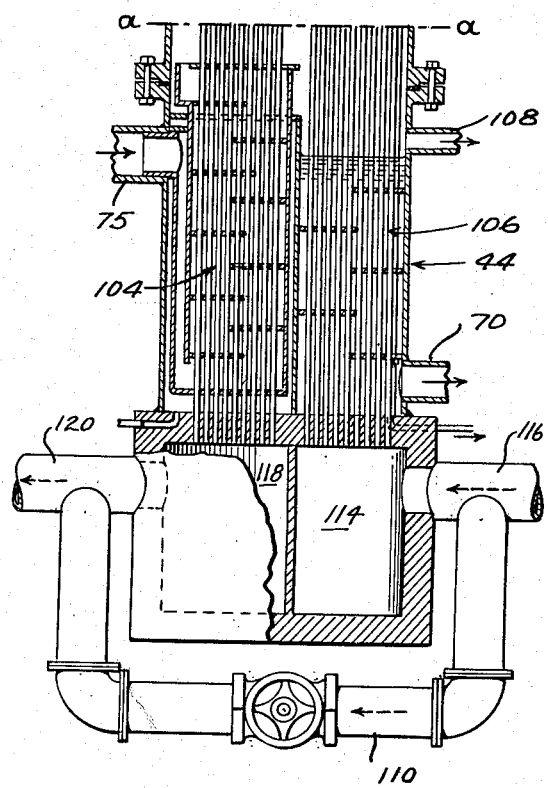
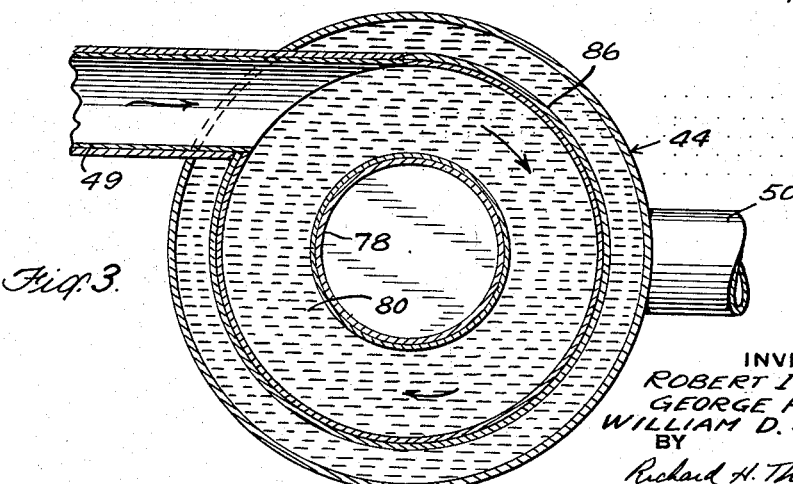
INVENTORS
ROBERT I. LYTLE
GEORGE P. MORAN
WILLIAM D. STEVENS
BY
Richard H. Thomas
ATTORNEY

United States Patent Office 3,183,896
Patented May 18, 1965

3,183,896
SEPARATING HEATER
Robert I. Lytle, Morristown, George P. Moran, Basking Ridge, and William D. Stevens, North Caldwell, N.J., assignors to Foster Wheeler Corporation, New York, N.Y., a corporation of New York
Filed Jan. 15, 1964, Ser. No. 337,860
6 Claims. (Cl. 122—406)

This invention relates to a once-through subcritical or supercritical steam generator flow system, and in particular, to novel means for start-up, re-start and operation of a once-through steam generator.

In a once-through generator, it is desirable to have for and during the start-up of the generator means for separating a two-phase fluid into its base components. The high-enthalpy phase is utilized in turbine gland sealing, pegging the deaerator and in the superheater for early rolling and synchronizing the turbine. Also this phase of the fluid is directed to a heat exchanger where its latent heat is transferred to the incoming feedwater. The lower enthalpy phase is circulated back to the steam generator through a deaerator and proper circuits.

To perform the two functions of fluid separation and latent heat transfer, a start-up by-pass system, including a flash tank and a heat exchanger, is utilized representing a substantial investment in two high pressure vessels and associated components.

It is an object of the invention to perform the foregoing functions within a single vessel, hereinafter called a separating heater, in a novel and facile manner which will provide a greater heat recovery and will represent a lower capital investment for the required functions.

The invention provides means for separating the two-phase fluid into its basic components and at the same time provides means by which the latent heat of the high enthalpy fluid is transferred to the incoming feedwater. In addition, the low enthalpy fluid is handled within the separating heater and is transferred back to the cycle. This, in effect, allows for a better heat recovery within the cycle obtaining a minimum loss of start-up heat input and logically a minimum start-up time.

Also provided in accordance with the invention is a means to direct the high enthalpy fluid to the turbine gland seals, deaerator, and to the turbine for early rolling once the point is reached when the incoming steam quantity exceeds the latent heat absorbing capability of the heat exchanger. A secondary means of separating any possible undesirable quality from this high enthalpy fluid is provided as an embodiment in accordance with the invention.

The latent heat absorbing capacity of the separating heater is controlled by means of a by-pass of the incoming feedwater, in order to deliver the high enthalpy fluid sooner to the turbine for warming up and early rolling.

It is a further feature of the invention to provide a means for transferring heat to the incoming feedwater during normal operation, that is, when the start-up by-pass system is taken out of service. This is accomplished in accordance with the invention by making use of the desuperheating, condensing, and sub-cooling surfaces in the separating heater for transferring heat from high-enthalpy intermediate turbine bleed fluid to feedwater.

These objects and advantages of the invention will become apparent upon consideration of the specification and accompanying drawings, in which:

FIGURES 2 and 2A illustrate the separating heater vessel of the invention showing its basic components;

FIGURE 3 is a cross-section view taken along line 3—3 of FIGURE 2.

Figure 1:
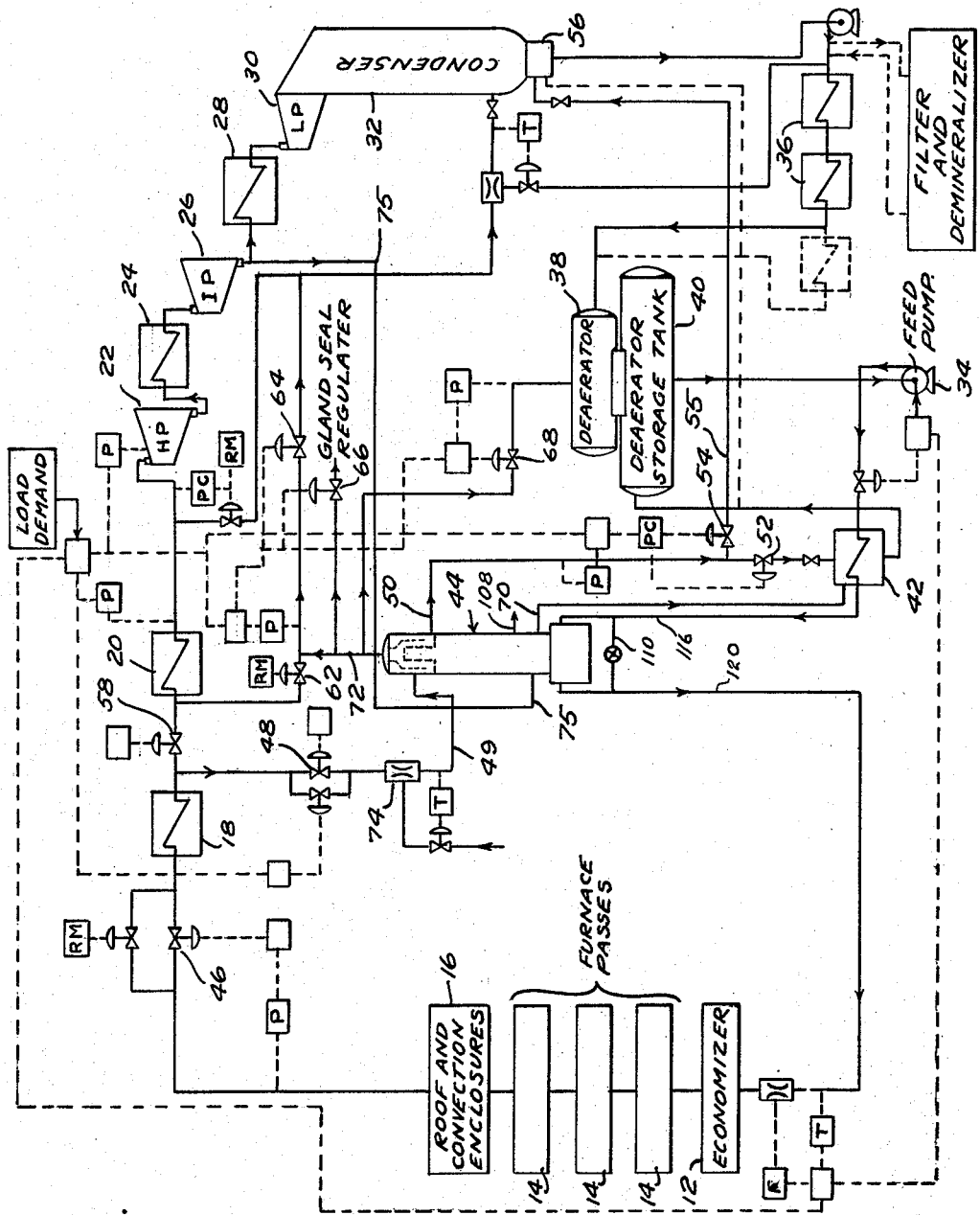
FIGURE 1 is a flow diagram for a once-through steam generator in accordance with the invention.

Referring to the embodiment of FIGURE 1, the vapor generating and turbine installation includes in series an economizer 12, furnace passes 14, and a roof and convection enclosure pass 16. Also constituting sections of the installation are a primary and/or platen superheating section 18 and a finishing superheating section 20. During normal operation of the unit, the flow is through the superheating sections 18 and 20 and from the outlet of the finishing superheating section to a high pressure turbine 22, the exhaust steam from the turbine being reheated at 24 and passed to an intermediate pressure turbine 26, a second reheater 28 and a low pressure turbine 30 in that order. From the low pressure turbine, the fluid passes to a condenser 32. Being of the once-through type, the system is pressurized by a feed pump 34, the fluid flowing from the condenser through low pressure heaters 36, deaerator 38, storage tank 40, high pressure heater 42, separating heater vessel 44 (alternatively by-pass 110) and then to the economizer 12.

Initially in the start-up operation of the steam generator, the feed pump 34 is driven to pressurize the unit upstream of a pressure reducing station 46 (described in copending application, Serial No. 281,452, filed May 20, 1963) and the fluid flow necessary for cooling the high pressure circuitry is established through the unit to the outlet of the primary superheater or platen superheater 18. One purpose of the reducing station 46 is to maintain normal operating pressure in the furnace circuitry for adequate cooling of the circuitry, and at the same time, to produce a reduced pressure in the convection surfaces downstream of the reducing station for improved heat transfer in these sections and more rapid start-up. Since the flow during this initial period is entirely liquid, the turbine is incapable of handling the flow, and accordingly the output from the superheater is by-passed around the turbine and is fed through stop valve 48 to the separating heater vessel 44. Details of the separating heater will be described further on. At this stage, the flow is simply through the vessel draining in line 50 past valve 52 to the high pressure heater 42 and from there to the deaerator storage tank 40. Valve 54 in the branch 55 of line 50 leading to the condenser hot well 56 is closed.

To accomplish by-pass of the start-up mixture from the superheater 18 to the separating heater, main flow line valve 58 between the platen or primary superheater 18 and inlet end of the finishing superheater 20 is closed so that no flow passes through this valve. Also closed is the separating heater vapor discharge valve 62 leading to the inlet end of the finishing superheater 20. Also, at this stage, other vapor lines from the separating heater are closed by valves 64, 66, and 68.

After the burners have been ignited and as the firing rate is increased, the pressure reducing station 46 maintains the desired pressure in the furnace circuitry of the unit. Downstream from the reducing station, valves 52 and 54 (in lines 50 and 55 leading from the separating heater 44) maintain an operating pressure of approximately 600 p.s.i. in the separating heater. As soon as some mixture of steam and water starts entering the separating heater 44 from the outlet of the primary superheater through valve 48, the heater functions to separate the steam from the water and to pass the steam to condensing surface within the heater, to be described, where heat is transferred to incoming feedwater.

The condensed steam is removed from the separating heater through line 70 at the bottom of the heater and also is directed to the high pressure heater 42 along with the flow from drain 50. In the high pressure heater 42, further heat is transferred to the incoming feedwater, thereby avoiding unnecessary heat loss.

Upon reaching the separating heater's condensing capability any additional steam is directed from the separating heater through line 72 at the top of the heater through proper valves (64, 66, and 68) to different accessories designed to make use of this steam at this time. Included is the deaerator and the turbine gland seals. Some stem is fed to the turbine through valve 62 for warming, rolling and initial loading.

Towards the end of the start-up operation, the steam entering the separating heater may be in the superheat state, and a means for controlling the steam temperature is provided by way of an attemperator 74.

Once the steam supplied by the generator meets the required conditions for turbine operation, that is, pressure and temperature, the separating heater start-up function is taken out of service by closing valves 48, 52, 54, 62, 66, and 68, and opening main line valve 58.

During normal operation of the steam generator, the feedwater to the generator is still directed through the separating heater for preheating prior to entering the economizer 12. Preheating is accomplished by bleeding superheated steam from an intermediate pressure turbine in line 75 and directing it into a desuperheating zone near the bottom of the separating heater. From the de-superheating zone the bleed steam passes thru a condensing zone and then thru a sub-cooling zone. Sub-cooled water is taken out through line 70 near the bottom of the heater and is fed into the high pressure heater 42 for further recovery of available heat.

A better understanding of the invention can be obtained from FIGURES 2, 2A, and 3. Although specific structure is set forth to explain operation of the separating heater and the manner in which it ties in with the steam generator, it is understood that the concepts of the invention are not limited to these specifics. For instance, separating heater orientation could be horizontal or vertical head up, rather than vertical head down as described herein.

FIGURES 2 and 3 show the internal arrangement of the high pressure heater including a fixed head 76, a vertical internal channel downcomer 78, an internal separation chamber 80 for steam generator start-up procedure, a condensing section 82, de-superheating section 104, sub-cooling section 106, and drain connections 50 and 70. A de-superheating zone and/or a sub-cooling zone are not necessarily required for successful operation of the separating heater.

Heated fluid from the furnace and superheating sections enter the separating heater tangentially via line 49 into the annular separation chamber. Separation of water and steam occur by centrifugal action. Upon separation, water is thrown to the outside of the annular chamber and collected in a reservoir 92 at the bottom of the chamber. The water level in the reservoir is controlled by valves 52 and 54 (FIGURE 1), and is maintained above the drain line 50 and above the bottom edge of the shroud in order to prevent steam from escaping around the bottom edge of the shroud. Any steam obtained in the separation process will rise within the separation chamber 80 and will then flow either downwardly in the downcomer 78 into the condensing zone 82 of the heater proper, or upwardly through a secondary means of separation 96. Initially in the start-up cycle, the flow of steam is downwards into the condensing zone 82, wherein the steam will be condensed in surface contact heat exchange with the colder boiler feedwater (entering inlet chamber 114 through conduit 116 and exhausting from chamber 118 to conduit 120) passing through the tubes 98 of the heater. Sub-cooled water is removed at the bottom of the heater through line 70 while saturated water in excess of sub-cooling zone capacity is removed thru line 108.

An impingement plate 102 is located between downcomer 78 and the condensing tubes 98 in order to prevent any excess moisture in the steam after separation from impinging directly on the tubes.

The flow of steam to the condensing zone 82 from the separating chamber is achieved as a result of a lower operating pressure in the condensing zone caused by condensation of the high enthalpy fluid being cooled by the incoming colder boiler feedwater.

Ultimately in the start-up cycle, the condensing capacity of the tubes 98 is met causing the pressures in the separating chamber and condensing zone to equalize, and steam then will pass upward through the secondary means of moisture elimination, item 96 and then out through line 72 (FIGURE 1). An example of item 96 is a high efficiency centrifugal separator shown in co-pending application Serial No. 107,698, filed May 4, 1961. Moisture obtained in this further separation descends outside of the shroud 86 into the reservoir 92.

FIGURE 2A shows the lower portion of the separating heater including the de-superheating and sub-cooling zones 104 and 106 respectively of the heater. Once the start-up system is taken out of service, superheated steam may be bled from an intermediate pressure turbine and admitted in line 75 to the de-superheating zone 104 of the heater proper, for heat conservation. Here the steam transfers its superheat to the incoming feedwater, the de-superheated vapor being transmitted to the condensing zone 82 for transfer of latent heat resulting in condensation of the steam. Saturated water then flows into the sub-cooling zone 106 for further transfer of heat to the colder feedwater. Sub-cooled water is removed through outlet 70. A water level is maintained in the sub-cooling zone 106 through external instrumentation.

FIGURE 1 illustrates an embodiment of the invention. A by-pass line 110 is provided to by-pass the incoming feedwater around the separating heater. By reducing the amount of feedwater flowing through the condensing tubes in the heater proper, a much faster pressure stabilization can be obtained between the separating chamber and the condensing zone. This will diminish the condensing capacity of the separating heater, and will result in an earlier production of steam for the accessories mentioned before.

This feedwater by-pass line is optional and is not required for satisfactory operation of the separating heater and the associated start-up system.

It is current powerplant practice to provide a feedwater heater by-pass line to permit continued unit operation in the event the feedwater heater becomes inoperative. A by-pass line, in accordance with the invention, to provide separating heater outlet steam flow control can be installed for little additional cost to the start-up system as compared to this current powerplant practice.

As one advantage, it was mentioned that a greater heat recovery could be achieved in accordance with the invention.

Prior practice has employed a separating vessel and a heat exchange vessel separated by a steam line, and one or more valves. Because of the pressure drop in this line and valves, the saturation temperature in the heat exchanger is less than in the flash tank. Consequently the heat exchanger efficiency is reduced resulting in a lower heat transfer to the feedwater.

The present invention minimized pressure drop between the separating and heat exchange chambers thus maximizing heat recovered by the feedwater.

In addition, the separating heater is less costly than a separate flash tank and feedwater heater combination because the former vessel requires only one fixed head whereas the latter two vessels require three fixed heads. The separating heater permits the start-up system to be simpler and less costly than one employing a separate flash tank and feedwater heater because the steam line connecting the flash tank and feedwater heater is eliminated, together with its one or more valves.

Although the invention has been described with respect to specific embodiments, many variations within the spirit and scope of the invention as defined in the following claims will be apparent to those skilled in the art. For instance, the separating zone of the heater can be constructed in accordance with the principles set forth in Patent No. 2,675,888, Blizard et al., "Vapor and Liquid Separator," with which a horizontally oriented heat exchange zone could be associated.

What is claimed is:

1. In a once-through vapor generator including heating sections, means for introducing feedwater to said sections, and means for conveying fluid from said sections to points of use, a start-up system comprising, an upright cylindrical pressure vessel, means defining in said vessel an upper first separating zone and a lower second condensing zone, a partition between said zones defining a central downcomer extending from above the bottom of the first zone to the top of the second zone, a shroud over and encompassing at least part of the downcomer defining with the downcomer an annular separation zone, means for tangentially admitting a two-phase fluid during start-up from the generator heating sections to said separation zone whereby the two-phase fluid is centrifugally separated into a high enthalpy phase and a low enthalpy phase, means for transmitting the low enthalpy phase fluid from the separation zone, means for maintaining a liquid level in the zone above the bottom edge of the shroud, the high enthalpy fluid passing through the downcomer to the second zone, U-shaped tubes in the second zone, means for transmitting the vapor generator feedwater through said tubes in surface heat exchange with the high enthalpy fluid, the cooling effect of the feedwater creating a low pressure in the second zone relative the pressure in the first zone by which the high enthalpy fluid is drawn into the second zone, the high enthalpy fluid condensing in the zone, means for transmitting the condensed high enthalpy fluid from the zone, said shroud further defining a riser above the downcomer, second separation means in said riser, an outlet in communication with said second separation means, and means to transmit dry steam from said outlet to points of use operative when the condensing capacity of the U-shaped tubes is met, the pressures in the first and second zones being equal, said system further having a by-pass for the feedwater around the vessel the use of which permits high enthalpy fluid to be conveyed sooner in the start-up period from said vessel outlet.

2. A once-through vapor-generator comprising:

a main flow path including in series a vapor generating section, a vapor superheating section means adapted to feed all of the flow from the vapor generating section to the superheating section, feedwater means for introducing feedwater to said generating section, means for conveying fluid from said superheating section to a point of use, means for conveying exhaust fluid from said point of use to said feedwater means, a start-up by-pass system by-passing said point of use comprising, a pressure vessel including a separating zone and a heat exchange zone, a first conduit leading from said main flow path downstream of the vapor generating section to said vessel separating zone for conveying a two-phase fluid during start-up of the generator to the separating zone, separating means in said separating zone for separating the fluid into a high enthalpy phase and a low enthalpy phase, means within said vessel leading from said separating zone to the heat exchange zone by which at least a portion of the high enthalpy phase is conveyed to the heat exchange zone, a second conduit leading from said separating zone to the main flow path downstream of the first conduit by which at least another portion of the high enthalpy phase is returned to the main flow path, means in the heat exchange zone by which sufficient latent heat in the high enthalpy phase is transferred to the vapor generator feedwater to condense the high enthalpy phase, third and fourth conduits leading from said separating zone and heat exchange zone, respectively, for recycling the low enthalpy phase and condensed high enthalpy phase to the feedwater means, said by-pass system further including valve means in said first and second conduits to isolate said by-pass system from the main flow path.

3. A once-through vapor generator comprising:

a main flow path including in series vapor generating and superheating sections, means adapted to feed all of the flow from the vapor generating section to the superheating section, feedwater means for introducing feedwater to said generating section, means for conveying fluid from said superheating section to a point of use, means for conveying exhaust fluid from said point of use to said feedwater means;

a start-up by-pass system by-passing said point of use comprising;

a pressure vessel including a first chamber defining a separating zone and a second chamber defining a heat exchange zone, said first chamber having a liquid space and a vapor space, partition means between said zones defining a passage extending from the vapor space of the first chamber to the heat exchange zone, a first conduit leading from said main flow path downstream of the vapor generating section to said vessel separating zone for conveying a two-phase fluid during start-up of the generator to the separating zone, said conduit means being adapted to tangentially admit said two-phase fluid during start-up into the separating zone vapor space in a manner whereby the high enthalpy phase of the fluid is separated from the low enthalpy phase, the latter flowing to the liquid space, heat exchange surface in said second chamber, means for transmitting the vapor generator feedwater into contact with said heat exchange surface, the condensing affect of said feedwater creating a low pressure in the second chamber by which the high enthalpy phase is drawn through said passage into the second chamber into indirect surface heat exchange with the feedwater, a second conduit leading from said separating zone vapor space to the main flow path downstream of the first conduit by which the high enthalpy phase is returned to the main flow path, third and fourth conduits leading from said separating zone and heat exchange zone, respectively, for recycling the low enthalpy phase and condensed high enthalpy phase to the feedwater means, and valve means in said first and second conduits to isolate said by-pass system from the main flow path.

4. A once-through vapor generator according to claim 3, further including means to by-pass feedwater around said heat exchange surface thereby providing high enthalpy fluid sooner in the start-up to said second conduit.

5. A once-through vapor generator according to claim 3 further including separation means in said separating zone between said second conduit and the separating zone vapor space by which dry steam is returned to the main flow path.

6. A start-up system according to claim 3 further including a desuperheating zone in said second chamber, baffle means separating the desuperheating zone from said heat exchange surface, means for transmitting a superheated phase fluid from said points of use to the desuperheating zone, further heat exchange surface in the desuperheated zone whereby the fluid is desuperheated, means for transmitting the desuperheated fluid from the desuperheating zone to direct contact with the first mentioned heat exchange condensing surface, the fluid condensing on said condensing surface, said further condensing heat exchange surface being an extension of said first mentioned desuperheating zone heat exchange surface.

References Cited by the Examiner

UNITED STATES PATENTS

| | | | |
|---|---|---|---|
| 2,756,028 | 7/56 | Byerley | 165—113 |
| 2,982,102 | 5/61 | Profos | 60—107 |
| 3,008,295 | 11/61 | Profos | 60—107 |
| 3,009,325 | 11/61 | Pirsh | 122—1 |

PERCY L. PATRICK, *Primary Examiner.*

KENNETH W. SPRAGUE, *Examiner.*